(12) United States Patent
Follestad et al.

(10) Patent No.: US 6,627,706 B1
(45) Date of Patent: Sep. 30, 2003

(54) OLEFIN POLYMERIZATION PROCESS

(75) Inventors: Arild Follestad, Stathelle (NO); Hannu Salminen, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/719,794

(22) PCT Filed: Jun. 16, 1999

(86) PCT No.: PCT/GB99/01916

§ 371 (c)(1), (2), (4) Date: Feb. 14, 2001

(87) PCT Pub. No.: WO99/65949

PCT Pub. Date: Dec. 23, 1999

(30) Foreign Application Priority Data

Dec. 17, 1998 (GB) ............................................... 9827862
Jun. 16, 1998 (GB) ............................................... 9813003

(51) Int. Cl.⁷ .................................................. C08F 2/34
(52) U.S. Cl. .................. 526/64; 526/113; 526/129; 526/90; 526/351; 526/352; 526/348; 526/170; 526/65; 526/901; 526/943; 526/905
(58) Field of Search .......................... 526/901, 64, 65, 526/943, 905, 113, 351, 352, 348, 90, 170, 129

(56) References Cited

U.S. PATENT DOCUMENTS

| | | |
|---|---|---|
| 3,356,667 A | 12/1967 | Smith et al. |
| 4,888,704 A | 12/1989 | Topliss et al. |
| 5,098,967 A | 3/1992 | Asanuma et al. |

FOREIGN PATENT DOCUMENTS

| | | |
|---|---|---|
| EP | 0 580 930 | 2/1994 |
| EP | 0 713 889 | 5/1996 |
| EP | 0 778 293 | 6/1997 |
| EP | 0778293 A2 * | 6/1997 |
| WO | WO 97 03139 | 1/1997 |

* cited by examiner

*Primary Examiner*—David W. Wu
*Assistant Examiner*—William K. Cheung
(74) *Attorney, Agent, or Firm*—Nixon & Vanderhye P.C.

(57) ABSTRACT

This invention relates to a process for the preparation of olefin polymers, preferably a multi-stage process, in which hydrogen is used to control the molecular weight of the olefin polymer produced in a continuous reactor, in particular a process wherein a metallocene or other single site catalyst is present in the polymerization reaction mixture, as well as to olefin polymers produced thereby.

17 Claims, No Drawings

OLEFIN POLYMERIZATION PROCESS

This invention relates to a process for the preparation of olefin polymers, preferably a multi-stage process, in which hydrogen is used to control the molecular weight of the olefin polymer produced in a continuous reactor, in particular a process wherein a metallocene or other single site catalyst is present in the polymerization reaction mixture, as well as to olefin polymers produced thereby.

Such preparation of polymers is effected by the use of a variety of catalyst systems, e.g. Ziegler-Natta catalysts, metallocene catalysts, and chromocene-silica catalysts. Typically such polymerisation may be performed in gas phase, slurry or solution phase continuous reactors. It is furthermore known to use hydrogen in polymerisation reactors in order to produce polymers of the desired molecular weight. Such molecular weight control is effected through control of the concentration of hydrogen. We have now surprisingly found that such molecular weight control may be performed more efficiently through control of the consumption of hydrogen.

Viewed from one aspect the invention provides a process for olefin polymerization, preferably for the production of an ethylene or propylene homo or copolymer, in particular for the preparation of ethylene copolymers, comprising polymerising at least one α-olefin in a continuous reactor in the presence of hydrogen and an olefin polymerization catalyst, preferably a catalyst comprising a metallocene or other single site catalyst, the hydrogen consumption rate being controlled during the polymerization whereby to control the molecular weight of the polymer product at the desired value.

Viewed from an alternative aspect the invention provides a process for olefin polymerization, preferably for the production of an ethylene or propylene homo or copolymer, in particular for the preparation of ethylene copolymers, comprising polymerising at least one α-olefin in a continuous, mixed reactor in the presence of hydrogen and an olefin polymerization catalyst, preferably a metallocene or other single site catalyst, control of the molecular weight of polyolefin produced being effected by controlling the ratio between A. The rate of hydrogen consumption in the reactor system from a mass balance B. The rate of production of polymer in the reactor system.

The term molecular weight is to be understood as relating to any molecular weight parameter of the polymer such as weight average MW, MFR, melt index ($MFR_2$), high load melt index ($MFR_{21}$), melt viscosity, intrinsic viscosity, viscosity average MW etc.

Viewed from another aspect the invention provides a process for olefin polymerization, preferably for the production of an ethylene or propylene homo or copolymer, in particular for the preparation of ethylene copolymers, which process comprises at least two continuous polymerization stages, a relatively earlier of said stages comprising polymerizing at least one α-olefin in the presence of hydrogen and an olefin polymerization catalyst whereby to produce a first polymerization product, and a relatively later of said stages comprising polymerizing said at least one α-olefin in the presence of an olefin polymerization catalyst whereby to yield a polymerization product having a lower $MFR_2$ than said first polymerization product, wherein the hydrogen consumption rate is controlled in said relatively early stage whereby to control the molecular weight of said first product.

It is preferred to use catalysts that are responsive to hydrogen: thus such a catalyst system might comprise a combination of metallocene and chromium catalysts especially where the chromium catalyst is in form of chromium oxide, preferably on particulate supports, especially with both loaded together on the same support particles.

The polymer product of the single stage process of the invention if used with a single site catalyst will have a relatively narrow molecular weight distribution (e.g. a low $MFR_{21}/MFR_2$ ratio) and thus may be suitable for rotomoulding, injection moulding or production of LLDPE film.

Alternatively where the invention is used in a multistage process, or where a catalyst system having catalyst sites very responsive to hydrogen concentration and sites less responsive or non-responsive to hydrogen concentration is used, the polymerization product will have a bimodal or multimodal, ie. broad, molecular weight distribution and may be suitable for blow moulding, film, pipe, wire, fibre or cable. By responsive to hydrogen concentration is meant a catalyst for which the molecular weight of the polymer product is altered if the hydrogen concentration used in the reaction mixture is varied, ie. a hydrogen consuming catalyst. Typically metallocene catalysts are more hydrogen responsive than Ziegler or chromium catalysts: thus such a catalyst system might comprise a metallocene catalyst alone or a combination of metallocene and chromium catalysts, preferably on particulate supports, especially with both loaded together on the same support particles.

The process of the invention may optionally comprise: further polymerisation stages before or after the hydrogen controlled stage, e.g. to produce a heterophasic polymer; drying steps; blending of the polymer product with one or more further materials, e.g. further polymers, antioxidants, radiation (e.g. UV-light) stabilizers, antistatic agents, fillers, plasticizers, carbon black, colors, etc.; granulation, extrusion and pelletization; etc.

Viewed from further aspects the invention provides an olefin polymer produced by a process according to the invention as well as the use of such polymers for the production of moulded articles, fibres, pipes, films, blow moulded, injection moulded and rotomoulded articles and products for wire and cable applications.

The process of the invention is one for the polymerization of α-olefins, in particular $C_{2-10}$ α-olefins, more particularly ethylene and propylene, especially ethylene. The polymer product of each polymerization stage may be a homopolymer or a copolymer (which term is used to include polymers deriving from two or more monomer species). Where the product is a copolymer, preferably at least 50% by weight of the polymer derives from a $C_{2-10}$ α-olefin monomer, more particularly from a $C_{2-4}$ α-olefin monomer, preferably ethylene or propylene. The other monomer(s) may be any monomers capable of copolymerization with the olefin monomer, preferably mono or polyunsaturated $C_{2-20}$ compounds, in particular monoenes or dienes, especially $C_{2-10}$ α-olefins such as ethene, propene, but-l-ene, pent-l-ene, hex-l-ene, oct-l-ene or mixtures thereof. Bulky comonomers, e.g. styrene or norbornene may also be used. Generally, the polymer produced in the polymerization stages will comprise the same α-olefin monomer, e.g. as the sole monomer or as the comonomer from which at least 50%, preferably 60 to 99.8% of the copolymer derives. Thus the polymer product will preferably be an ethylene homopolymer, an ethylene copolymer, a propylene homopolymer or a propylene copolymer.

If several reactors are used, the catalysts used in the different polymerization stages may be the same or different;

however the use of the same catalyst is preferred. The catalysts employed may be any catalyst capable of catalysing olefin polymerization and consuming hydrogen, e.g. Ziegler catalysts (e.g. Ziegler Natta catalysts), chromocene/silica catalysts, metallocene (ie. η-ligand complexed metals), etc. What is required is that the catalyst which is used in the hydrogen controlled stage be one which depletes the reaction mixture of hydrogen. It should preferably be a catalyst which uses up hydrogen more rapidly than the conventional Ziegler Natta or non-metallocene chromium catalysts. In this regard it is particularly preferred to use single site catalysts such as the catalytically effective metal:η-ligand complexes, ie. complexes in which the metal is complexed by the extended Π-orbital system of an organic ligand. Metallocenes are an example of complexes in which a metal is complexed by two η-ligands—in the present invention metal:η-ligand complexes may be used where the metal is complexed by one, two or more η-ligands. The use of twin η-ligand metallocenes and single η-ligand "half metallocenes" (e.g. those developed by Dow) is particularly preferred. However the term metallocene as used herein is used to refer to all such catalytically active complexes containing one or more η-ligands. The metal in such complexes is preferably a group 4, 5, 6, 7 or 8 metal or a lanthanide or actinide, especially a group 4, 5 or 6 metal, particularly Zr, Hf or Ti. The η-ligand preferably comprises a cyclopentadienyl ring, optionally with a ring carbon replaced by a heteroatom (e.g. N, B, S or P), optionally substituted by pendant or fused ring substituents and optionally linked by bridge (e.g. a 1 to 4 atom bridge such as $(CH_2)_2$, $C(CH_3)_2$ or $Si(CH_3)_2$) to a further optionally substituted homo or heterocyclic cyclopentadienyl ring. The ring substituents may for example be halo atoms or alkyl groups optionally with carbons replaced by heteroatoms such as O, N and Si, especially Si and O and optionally substituted by mono or polycyclic groups such as phenyl or naphthyl groups. Examples of such homo or heterocyclic cyclopentadienyl ligands are well known from the scientific and patent literature, e.g. from the published patent applications of Hoechst, Montell, Borealis, Exxon, and Dow, for example EP-A-416815, WO96/04290, EP-A-485821, EP-A-485823, U.S. Pat. No. 5,276,208 and US-A-5145819.

Thus the η-bonding ligand may for example be of formula I

$$CpY_m \qquad (I)$$

where Cp is an unsubstituted, mono-substituted or polysubstituted homo or heterocyclic cyclopentadienyl, indenyl, tetrahydroindenyl, fluorenyl, benzindenyl, cyclopenta[l]phenanthrenyl, azulenyl, or octahydrofluorenyl ligand; m is zero or an integer having a value of 1, 2, 3, 4 or 5; and where present each Y which may be the same or different is a substituent attached to the cyclopentadienyl ring moiety of Cp and selected from halogen atoms, and alkyl, alkenyl, aryl, aralkyl, alkoxy, alkylthio, alkylamino, $(alkyl)_2P$, alkylsilyloxy, alkylgermyloxy, acyl and acyloxy groups or one Y comprises an atom or group providing an atom chain comprising 1 to 4 atoms selected from C, O, S, N, Si and P, especially C and Si (e.g. an ethylene group) to a second unsubstituted, mono-substituted or polysubstituted homo or heterocyclic cyclopentadienyl, indenyl, tetrahydroindenyl, fluorenyl or octahydrofluorenyl ligand group.

In the η-bonding ligands of formula I, the rings fused to the homo or hetero cyclopentadienyl rings may themselves be optionally substituted e.g. by halogen atoms or groups containing 1 to 10 carbon atoms.

Many examples of such η-bonding ligands and their synthesis are known from the literature, see for example: M öhring et al. J. Organomet. Chem 479:1–29 (1994), Brintzinger et al. Angew. Chem. Int. Ed. Engl. 34:1143–1170 (1995).

Examples of suitable η-bonding ligands include the following:

cyclopentadienyl, indenyl, fluorenyl, pentamethyl-cyclopentadienyl, methyl-cyclopentadienyl, 1,3-di-methyl-cyclopentadienyl, i-propyl-cyclopentadienyl, 1,3-di-i-propyl-cyclopentadienyl, n-butyl-cyclopentadienyl, 1,3-di-n-butyl-cyclopentadienyl, t-butyl-cyclopentadienyl, 1,3-di-t-butyl-cyclopentadienyl, trimethylsilyl-cyclopentadienyl, 1,3-di-trimethylsilyl-cyclopentadienyl, benzyl-cyclopentadienyl, 1,3-di-benzyl-cyclopentadienyl, phenyl-cyclopentadienyl, 1,3-di-phenyl-cyclopentadienyl, naphthyl-cyclopentadienyl, 1,3-di-naphthyl-cyclopentadienyl, 1-methyl-indenyl, 1,3,4-tri-methyl-cyclopentadienyl, 1-i-propyl-indenyl, 1,3,4-tri-i-propyl-cyclopentadienyl, 1-n-butyl-indenyl, 1,3,4-tri-n-butyl-cyclopentadienyl, 1-t-butyl-indenyl, 1,3,4-tri-t-butyl-cyclopentadienyl, 1-trimethylsilyl-indenyl, 1,3,4-tri-trimethylsilyl-cyclopentadienyl, 1-benzyl-indenyl, 1,3,4-tri-benzyl-cyclopentadienyl, 1-phenyl-indenyl, 1,3,4-tri-phenyl-cyclopentadienyl, 1-naphthyl-indeny, 1,3,4-tri-naphthyl-cyclopentadienyl, 1,4-di-methyl-indenyl, 1,4-di-i-propyl-indenyl, 1,4-di-n-butyl-indenyl, 1,4-di-t-butyl-indenyl, 1,4-di-trimethylsilyl-indenyl, 1,4-di-benzyl-indenyl, 1,4-di-phenyl-indenyl, 1,4-di-naphthyl-indenyl, methyl-fluorenyl, i-propyl-fluorenyl, n-butyl-fluorenyl, t-butyl-fluorenyl, trimethylsilyl-fluorenyl, benzyl-fluorenyl, phenyl-fluorenyl, naphthyl-fluorenyl, 5,8-di-methyl-fluorenyl, 5,8-di-i-propyl-fluorenyl, 5,8-di-n-butyl-fluorenyl, 5,8-di-t-butyl-fluorenyl, 5,8-di-trimethylsilyl-fluorenyl, 5,8-di-benzyl-fluorenyl, 5,8-di-phenyl-fluorenyl and 5,8-di-naphthyl-fluorenyl.

Besides the η-ligand, the catalyst complex used according to the invention may include other ligands; typically these may be halide, hydride, alkyl, aryl, alkoxy, aryloxy, amide, carbamide or other two electron donor groups.

In a preferred embodiment the catalyst composition comprises two η-ligand catalysts, most preferably a combination of an unbridged (alkyl substituted) metallocene with a substituted silicon bridged bis(indenyl) zirconium dichloride catalyst, the latter preferably being substituted on the 1 and 4 positions.

Where a Ziegler Natta catalyst is used in the later polymerization stage, this may be any convenient Ziegler Natta catalyst, e.g. a group 4 metal chloride (e.g. titanium chloride) associated with $MgCl_2$, MgO or $SiO_2$ (see also PCT/SE96/01652).

The catalyst systems used may of course involve co-catalysts or catalyst activators and in this regard any appropriate co-catalyst or activator may be used. Thus for η-ligand complexes, aluminoxane or boron compound cocatalysts may be used. It is envisaged however that the use of extra added cocatalyst may not be required.

Preferred aluminoxanes include $C_{1-10}$ alkyl aluminoxanes, in particular methyl aluminoxane (MAO) and aluminoxanes in which the alkyl groups comprise isobutyl groups optionally together with methyl groups. Such aluminoxanes may be used as the sole co-catalyst or alternatively may be used together with other co-catalysts. Thus besides or in addition to aluminoxanes other cation complex forming catalyst activators may be used. In this regard mention may be made of the silver and boron compounds known in the art. What is required of such activators is that they should react with the η-liganded complex to yield an organometallic cation and a non-coordinating anion (see for example the discussion on non-coordinating anions J in EP-A-617052 (Asahi)).

Aluminoxane co-catalysts are described by Hoechst in WO 94/28034. These are oligomers having up to 40, preferably 3 to 20, [—Al(R")O]— repeat units (where RI" is hydrogen, $C_{1-10}$ alkyl (preferably methyl and/or isobutyl) or $C_{6-18}$ aryl or mixtures thereof) and probably have cage like structures.

It is preferred that no separate feed of liquid cocatalyst is used as such a feed may disturb chain transfer reactions.

It is particularly desirable that the catalytic sites or their precursors be supported on a solid substrate to obtain particulate catalysts for use in such polymerization reactions. Such substrates are preferably porous particulates, e.g. inorganic oxides such as silica, alumina, silica-alumina or zirconia, inorganic halides such as magnesium chloride, or porous polymer particles, e.g. acrylate polymer particles or styrene-divinylbenzene polymer particles. Weight average median particle sizes are preferably in the range 10 to 60 μm and porosities are preferably in the range 1 to 3 mL/g. The complex may be loaded onto the support before, or more preferably after it has been reacted with a co-catalyst. Desirably, inorganic supports are heat treated (calcined) before being loaded with the complex.

The catalyst system used may have more than one active catalytic site. Preferably these are uniformly distributed over the support (carrier) particles, especially with each type of site being uniformly distributed on the same particles. Preferably one of the types of active sites is more hydrogen consuming than the other, e.g. the support particles could be loaded with a metallocene and a chromium catalyst or a metallocene and a Ziegler catalyst or two metallocene catalysts of different hydrogen consuming ability.

The processes of the invention may be carried out in a single reactor or in a series of two or more reactors. Each polymerization stage may be effected using conventional procedures, e.g. as a slurry, gas phase, solution or high pressure polymerization. Slurry polymerisation includes polymerisation at slightly supercritical conditions. Mixed gas phase and slurry reactors are preferred. Slurry polymerization (e.g. bulk polymerization) is preferably effected, e.g. in a tank reactor or more preferably a loop reactor. The polymerization process may use a series of two or more reactors, preferably loop and/or gas phase reactors, e.g. a combination of loop and loop, gas phase and gas phase or most preferably loop and gas phase reactors. In slurry reactors, if a major monomer is propylene this may also function as a solvent/diluent as well as a reagent. If the major monomer is ethylene, a non-polymerizable organic compound, e.g. a $C_{3-10}$ alkane, for example propane or isobutane, may be used as a diluent. Where this is done, the volatile non-reacted or non-reactive materials will desirably be recovered and reused.

Most preferably the process of the invention is effected, after an initial prepolymerisation stage, in a slurry loop reactor followed by a gas phase fluidised reactor, optionally employing a further gas phase reactor after the first gas phase. In any of these reactors, the hydrogen control of molecular weight may take place. The reactor used in the polymerization process of the invention should be continuous. This should be understood also to include the case when feeds to and flows from the reactor may be intermittent if the time constant of the intermittent flows are shorter than the average residence time in the reactor.

Such multi-reactor processes may be used for example for the production of heterophasic (impact resistant) polypropylene where in one stage mainly polyethylene may be produced using for example a metallocene catalyst and hydrogen to control molecular weight.

Typical reaction conditions for loop and gas phase reactors are: loop—temperature 60–110° C., pressure 30–70 bar, mean residence time 30–80 minutes; and gas phase—temperature 60–110° C. (preferably 80–105° C.), pressure 10–25 bar, mean residence time 20–300 minutes. Where hydrogen is used to control molecular weight/$MFR_2$, the hydrogen partial pressure will typically be 0.0001 to 0.5 bar.

The final polymer product of the process of the invention will preferably have a $MFR_{21}$ of about 1 to an $MFR_2$ of about 100, a weight average molecular weight (Mw) of 30000 to 500000, a melting point of 100–1650° C. (e.g. 100–136° C. for polyethylenes and 120 to 165° C. for polypropylenes) and a crystallinity of 20 to 70%. The polymer product of a hydrogen consumption-controlled stage of a multistage process according to the invention is preferably from $MFR_{21}$ about 0.01 to $MFR_2$ about 5000. (i.e. if only this reaction stage were performed using the same reaction conditions then these would be the MFR values).

This polymer can be formulated together with conventional additives, e.g. antioxidants, UV-stabilizers, colors, fillers, plasticizers, etc. and can be used for fibre or film extrusion or for raffia, or for pipes, or for cable or wire applications or for moulding, e.g. injection moulding, blow moulding, rotational moulding, etc., using conventional moulding and extrusion equipment.

In the process of the invention, control over the molecular weight of the polymer produced in a stage involving use of hydrogen and a hydrogen responsive catalyst can be readily achieved by monitoring of the hydrogen and monomer consumption, ie. for hydrogen the difference between hydrogen fed in and hydrogen flow out and for monomer the difference between monomer fed in and flow out. The ratio of hydrogen consumption to monomer consumption can be correlated well with polymer molecular weight or MFR (e.g. $MFR_2$) and the product molecular weight or MFR can accordingly be adjusted to the desired level using this correlation and by appropriate adjustment of the hydrogen and monomer feed rate levels. This is a novel means of molecular weight control and forms a further aspect of the invention. Viewed from this aspect the invention provides a method of olefin polymerization in a continuous throughput reactor, e.g. a gas phase or loop reactor, in which hydrogen and an olefin monomer are continuously introduced into said reactor and polymer and unreacted monomer are continuously removed from said reactor, characterised in that the ratio between the difference or predicted difference between hydrogen fed into and flow out from the reactor and the polymer production rate or predicted production rate in that reactor is determined or predicted and adjusted, e.g. manually, regularly or continuously, to a value within a desired range whereby to cause the polymer removed from said reactor to have a desired value of a molecular weight related parameter, e.g. MFR (ie. melt flow rate, melt index, high load melt index etc, for example $MFR_2$), melt viscosity, intrinsic viscosity, weight average molecular weight, number average molecular weight, viscosity average molecular weight, etc.) Where hydrogen conversion is greater than 50%, preferably where it is greater than 80%, the difference between hydrogen input and hydrogen output may if desired be replaced simply by the hydrogen input value. Similarly, the difference between monomer input and output may be replaced by the polymer production rate. The method of the invention is preferably used if the hydrogen conversion is greater than 50%, preferably greater than 80% and most preferably when conversion is greater than 90%.

In this method, the polymerization catalyst advantageously comprises an η-liganded metal as discussed herein, preferably a group 4 to 6 metal, particularly Zr, Hf or Ti and preferably Zr or Hf. The method is particularly advantageous when the ratio of hydrogen output from to hydrogen input to the reactor is from 0 to 50:100, especially 0 to 20:100. Furthermore the method is particularly suited to polymerization processes in which polymer particles are formed, e.g. bulk, slurry or gas phase reactions rather than solution reactions, for example processes where the reactor temperature is less than 115° C. The method is especially preferred for the production of ethene and propene homo- or copolymers (which latter term includes also polymers comprising three or more comonomers).

The measurement of molecular weight (and related parameters) for polymers from a polyolefin-producing plant is usually done in a laboratory on samples of polymer powder taken out from the process after a reactor, often after an in-process drying step. Such measurement is resource-consuming, so usually samples are measured at intervals of many hours. This means that if an important deviation in such parameters is discovered, many hours of production of the deviating product may already have been made. More recently, in-line measurements based on melt viscosity are coming into use to reduce such risk. However, these instruments are often placed far downstream of the polymerization process, so the ideal goal of getting a direct measurement of the molecular weight related parameter of the polymer being produced is not solved. Even if such an instrument was placed close to the polymerization process, there would still be a time lag since even the composition in the reactor itself would not be the same as the actual polymer being polymerized at that instant in the reactor.

Also, since the polymer in a reactor is often a mixture of polymer made in that reactor with one or more made in previous reactors, and especially since the previously made polymer may have been made with much higher molecular weight than the polymer being made in the present reactor, in which case any polymer solution or polymer melt viscosity based molecular weight will then almost exclusively be determined by the previously made polymer, in which case the viable method of achieving molecular weight control over the polymer made in the present stage, to ensure consistent quality of the final polymer, is to calculate this from the reactor parameters, especially from the effect of hydrogen. So another aspect of this invention is using the ratio of chemical consumption of hydrogen over the production rate in a reactor to estimate the molecular weight made in that reactor, or to provide consistency of the product made in that reactor, or to provide consistency of the final polymer product from the process, in the absence of measured polymer molecular weight from that polymerization stage being used as the basic control parameter.

In order to produce a polymer with the right directly measurable molecular weight related parameter, the following method is usually presently used:

1. Based on the molecular weight goal and the previous measurements of the molecular weight, and the concentrations in the reactor during the previous time (hydrogen, monomers, cocatalyst (if present)), reactor temperature and catalyst type, are used to calculate or guess a favourable value for the hydrogen concentration or the ratio between hydrogen concentration and monomer concentration.

2. The hydrogen feed to the reactor is controlled to reach this mentioned favourable hydrogen concentration or ratio between hydrogen and monomer, and is then maintained at this value.

3. Repeat steps 1 and 2 periodically.

As described above, step 1 constitutes the outer loop of a cascaded control system of which step 2 constitutes the faster inner loop. A further inner loop could be in the cascaded system if a hydrogen flow measurement is used to control the hydrogen flow value.

A control room operator was usually required to perform step 1. Now computer control is usually used. For instance, computer models may predict behaviour of concentrations in the reactor and from these predictions the molecular weight. Advanced models may include use of a mechanistic, kinetic approach to molecular weight control. Such an approach is shown in: K. McAuley and J. MacGregor, AIChE Journal, Vol. 37, no. 6, pages 825–835.

The control methods currently in use allow an estimation of the molecular weight of the resultant polymer directly from the concentration of hydrogen (or ratio of hydrogen concentration to monomer concentration) in the reactor. The methods do not require an estimate of hydrogen consumption which depend heavily on the field of hydrogen.

It should be noted that there exist different control philosophies which will affect the detailed methods of exploiting the invention. For instance, it may be a goal to keep constant the molecular weight being polymerized in a reactor or leaving a reactor. The goal may also be to get consistent product out of the final reactor of a series. When doing grade transitions, either by process parameters or by catalyst or by both, other goals than keeping constant product may apply.

In the method of the invention the rate of chemically consumed molecular hydrogen may be found by mass balance as the difference between the rate of molecular hydrogen going into the reactor system and the sum of the rates of molecular hydrogen leaving the reactor and accumulating in the reactor. A similar mass balance can be made by omitting the accumulation, however, this is not preferred.

To achieve a true value for the chemically consumed hydrogen rate relevant to molecular weight control, corrections may have to be done for side reactions involving hydrogen. For example hydrogen may be produced from monomer (for example ethylene) during the course of polymerisation. The rate of generation of hydrogen from an additional hydrogen source—or the rate of an additional consumption of hydrogen—may be approximated in various ways, and used to correct abovementioned mass balance to achieve the most true value of hydrogen consumed by chain transfer reactions. Also it should be noted that hydrogen may enter the reactor both as a controlled feed, or as non-reacted hydrogen in the product leaving a previous reactor, as well as by recirculation streams.

The rate of consumption of monomer is best found by a heat balance of the reactor or a mass (or molar) balance of monomer, or a combination of these. By mass or molar balance method, the production rate of polymer is the difference between monomer going into the reactor system and the sum of the rates of monomer leaving the reactor and accumulating in the reactor. This balance might be done on weight basis or molar basis. By the heat balance method, the rate of heat generation by polymerisation is found in essence as the difference between the sum of rates of heat removed by the cooling system (needed for heating of feed streams to the reactor temperature), accumulating in the reactor and for heat loss, and the sum of the rates of optional heat lost by mass at above the reactor temperature leaving the reactor system, and that generated by agitation. The polymerisation rate can then be found from the rate of heat generation by polymerisation, through the value of heat of polymerisation (heat generated per weight or mol monomer polymerised). A simplified mass balance neglects the monomer accumulated in the reactor; however, this is not preferred.

The reactor system over which these mass and heat balances should be taken should in many cases include more than the reactor vessel itself. Thus for a fluidised gas phase reactor the optional cooling/fluidizing system taking gas from the reactor bed and returning it as gas or partial condensate after cooling, is included in the reactor system. In slurry tank reactors the optional cooling system where cooling is effected by boiling liquid off from the slurry, then partly condensing the gas and returning the condensed liquid and residual gas to the slurry, is also included in the reactor system.

The ratio between rate of hydrogen chemical consumption and the rate of production of polymer in the reactor system can then be found. It shall of course be understood that the details of a polymerization process are complicated and specific arrangements of each process may need to be considered in detail to arrive at the exact hydrogen chemical consumption rate and the polymerization rate. This will be readily achieved by the person skilled in the art.

In order to produce a polymer with the right directly measurable molecular weight related parameter, the following method may thus be used:

1. The molecular weight goal, the molecular weight measurement during the last period and the chemical consumption ratio during the last period, are used to calculate or estimate a favourable set point for the chemical consumption ratio. In addition, the type of catalyst and cocatalyst as well as the concentrations of reagents and reactor temperature may be used to modify this calculation to further improve the result.
2. The hydrogen concentration or the ratio between hydrogen concentration and ethylene concentration should be used to calculate a set point for the hydrogen fed flow.
3. The hydrogen feed flow is controlled using the hydrogen feed valve.
4. Repeat steps 1, 2 and 3 periodically.

Thus described, the hydrogen control system consists of a cascaded system of which step 1 constitutes the outer loop and step 2 constitutes the inner faster loop and step 3 the innermost fastest loop.

A preferred method of employing the invention, is by using predictive computer control. An example of such a method is outlined below:

1. The target molecular weight parameter is set by the operator.
2. The target molecular weight parameter from step 1 is translated into a (target) consumption ratio between hydrogen and monomer. This is done by previous experience/knowledge about the relation between this ratio and the molecular weight parameter.
3. Kinetic models are used to calculate the consumption (reaction rate) of hydrogen and the polymerisation rate of monomer, and hence the chemical consumption ratio between hydrogen and monomer.
4. The kinetic model constants are corrected using the mass balance for hydrogen and monomer to adapt the model to the actual process behaviour.
5. Using the kinetic models along with mass balances for the components in the reactor system, the way hydrogen consumption is influenced by hydrogen feed, and polymerisation rate is influenced by monomer feed and/or catalyst feed is calculated This model also can be used to predict the behaviour of the process, and is an important part of the controller in step 6.
6. Using model based predictive control (MPC) algorithm as described in M. Hillestad, K. S. Andersen: Model predictive control for grade transitions for a polypropylene reactor, 4th European Symposium on Computer Aided Process Engineering, Dublin, Mar. 18–30, 1994, the value for the molecular weight parameter can be controlled to the target found in step 1 using hydrogen feed and/or the monomer feed as manipulated variables.

Another preferred way of employing the invention is by using a cascaded control loop system for molecular weight control.

It should also be noted that although it is preferred to estimate a molecular weight related parameter from the ratio of hydrogen chemical consumption over polymer production, there are other options. Especially for multistep processes, consistency of the final product may be obtained with the help of ratio of hydrogen chemical consumption over polymer production by other means than by estimation of a molecular weight parameter, for instance by multivariate soft models.

If there is a high conversion of both the main monomer and hydrogen (for example, above 85%), a simple, approximate version of above step 1 would be to base control of molecular weight on the ratio of hydrogen feed over the polymer production rate.

For step no. 1, it is of interest to have a computer model of molecular weight versus reactor process operating data for the same purpose as the kinetic equation developed by McAuley et al. (supra).

The following is an example of development of such an equation system:

The number-average molecular weight of the polymer is the sum of chain transfer rates divided by the propagation rate $$(1) \quad \frac{1}{X_n} = \frac{r_o + r_h}{r_p} = \frac{r_o}{r_p} + \frac{r_h}{r_p} \tag{1}$$

$$(2) \quad \frac{1}{X_n} = f(c_{m1}, c_{m1}, c_{m2}, c_c, T, \ldots) + \frac{r_h}{r_p}$$

where $f(C_{m1}, C_{m1}, C_{m2}, C_c, T, \ldots)$ is a function of reactor parameters except hydrogen.

If $f(C_{m1}, C_{m1}, C_{m2}, C_c, T, \ldots)$ may be considered constant, equation (2) can be written:

$$(3) \quad \frac{1}{X_n} = K + \frac{r_h}{r_p}$$

where
 C Concentration
 K Constant
 r Molar rate
 T Temperature
 $X_n$ Number-average degree of polymerisation.
Indices:
 c Cocatalyst
 h Hydrogen
 m1 Monomer 1
 m2 Monomer 2
 o Reactor parameters that are not related to hydrogen
 p Propagation
Specifically:
 $r_o$ Rate of chain transfer reactions that are not dependent on hydrogen $r_h$ Rate of chain transfer reaction with hydrogen=Rate of hydrogen chemical consumption $r_p$ Rate of propagation of monomer=Polymerisation rate From the number-average degree of polymerisation one can reach other molecular weight relevant parameters. For instance, MFR is usually considered related to this as:

$$MFR = Const \cdot (X_n)^\alpha \quad (4)$$

Usually α is found to be about:

$$\alpha = -3.5 \quad (5)$$

Equations (3), (4) and (5) together give $$(6) \quad MFR = Const. \left[ K + \frac{r_h}{r_p} \right]^{3\frac{1}{2}}$$

This equation gives a direct means of predicting the MFR by the ratio between the hydrogen chemical consumption rate and the polymerisation rate. It also provides a means to predict the MFR change from previous conditions from the change in this ratio.

Equation (6) can be transformed to $$(7) \quad \frac{r_h}{r_p} + K = \left[ \frac{MFR}{Const} \right]^{\frac{1}{3.5}}$$

This equation gives a means of establishing a set point for $r_h/r_p$ from the desired value of MFR.

When the catalyst consumes hydrogen fast and also reduces molecular weight very fast with increasing amounts of hydrogen, then, depending on the intended molecular weight of the product, it may happen that the analysed hydrogen concentration will be relatively uncertain, and it may even be that it is below the detection limit. This makes control of molecular weight by hydrogen concentration very difficult/uncertain.

However, exactly the opposite happens with control based on the invention: usually the amount of hydrogen fed can be measured rather precisely/reproducibly. If the conversion of hydrogen is low, the amount of hydrogen leaving the reactor can be measured rather precisely. However, if there is low conversion of hydrogen, there is very little difference between the amount of hydrogen going in and out, and the difference between these is not precise/reproducible. But if the hydrogen conversion is high, then the difference between hydrogen going in and going out becomes large in comparison to the amount of hydrogen going out. Then the difference can be calculated quite precisely.

Also, there could occur disturbances in the relationship between hydrogen concentration in the reactor and the molecular weight of the polymer, due to different kinetics in the chain transfer reactions taking place with hydrogen. This might occur if there was a change in the reactor temperature, a change in the properties of the catalyst or a change in the mass transfer properties between the medium between polymer particles and the active sites. The method of the present invention does not suffer from these disadvantages, especially where in Equation (3) $K << r_h/r_p$.

Monomer concentration used as input in present control systems is based on monomer concentration outside polymer particles, so that disturbances in mass transfer properties of the medium between polymer particles and the active sites also will disturb the molecular weight control. (See T. F. McKenna et al., J. Appl. Pol. Sci., Vol 63 (1997), pages 315–322.) The method of the invention is independent of such mass transfer generated disturbances.

In slurry loop reactors for polyethylene with settling legs, the monomer concentration usually is measured after the settling legs, and this does not give a precise estimate of ethylene concentration in the actual loop because of all the extra conversion of ethylene taking place in the settling legs. Since in this case, the traditional method of control would be based on the ratio between hydrogen and ethylene concentration, the result would be poor if the extra conversion of ethylene in the settling legs is not very stable.

The present invention will now be described further with reference to the following non-limiting Examples.

EXAMPLE 1

Catalyst Preparation

Porous silica powder (Sylopol 55SJ from Grace Davison) was calcined for 4 hours in a flow of dry air at 600° C. The product, the catalyst support or carrier had a pore volume of about 1.55 mL/g.

An impregnation solution was prepared by mixing under nitrogen (nBu-Cp)$_2$ ZrCl$_2$ (Eurocene 5031 from Witco) 0.953 kg, MAO solution (30 wt % MAO in toluene from Albemarle SA) 92L, and toluene 25.4 kg.

86 kg of the carrier at 25° C. was placed in a steel vessel fitted with a stirrer. The impregnation solution was added over a period of 1.5 hours with agitation. Agitation was continued for a further 3 hours. Over a period of 7 hours, the mixture was dried by nitrogen flow and by heating to about 45° C. A final vacuum drying was effected to yield a supported catalyst having a Zr content of 0.14 wt % and an aluminium content of 11.0 wt %.

EXAMPLE 2

Polymerization

A supported catalyst was prepared analogously to Example 1 but with increased amounts of Zr complex and MAO such that the product had a Zr content of 0.25 wt % and an aluminium content of 13.6 wt %. This catalyst was used in a continuous 500L loop reactor for copolymerization of ethene and hex-1-ene, operating at 85° C. and 65 bar with 1 to 2 hours average residence time.

EXAMPLE 3

Polymerisation (Comparative)

A supported Ziegler Natta catalyst comprising a silica carrier, 2% by weight Ti, 1.9% by weight, 2.4% by weight Mg, Al and Cl (prepared in accordance with Example 2 of WO95/35323) was used as the catalyst in place of the metallocene catalyst in a one stage polymerization as described in Example 2.

EXAMPLE 4

Polymerization Parameters and Product Properties

The polymerization parameters and the properties of the products produced in the one stage polymerizations of Examples 2 to 4 are set out below in Tables 1, 2 and 3 respectively.

TABLE 1

| Example No. | 2.1 | 2.2 | 2.3 | 2.4 | 2.5 |
|---|---|---|---|---|---|
| Catalyst Feed Rate (g/hr) | 21.5 | 26.0 | 9.0 | 8.0 | 9.0 |
| Diluent (Propene) Feed Rate (kg/hr) | 30 | 25 | 27 | 34 | 26 |
| Ethene Feed Rate (kg/h) | 30 | 21.5 | 33 | 29.5 | 19 |
| Hex-1-ene Feed Rate (kg/h) | 0.92 | 0.8 | 0.9 | 1.3 | 0.55 |
| Hydrogen Feed Rate (g/h) | 0 | 0 | 1.5 | 2 | 5 |
| Reactor Product | | | | | |
| Ethylene (mol %) | 7 | 8 | 6.2 | 7.5 | 8.0 |
| Hydrogen (mol %) | 0 | 0 | ND | ND | ND |
| Solids (wt %) | 13 | 10 | 20 | 22 | 13 |
| $H_2/C_2H_4$ (mol/kmol) | 0 | 0 | <2.4 | <1.6 | <1.9 |
| $C_6H_{12}/C_2H_4$ (mol/kmol) | 35 | 33 | 40 | 50 | 40 |
| % $H_2$ Conversion | — | — | >87% | >90% | >96% |
| $MFR_2$ | 1.5 | 1.9 | 27 | 80 | 388 |

ND = not detectable

TABLE 2

| Example No. | 3.1 | 3.2 | 3.3 |
|---|---|---|---|
| Catalyst Feed Rate (g/hr) | 5.0 | 5.0 | 5.7 |
| Diluent (Propane) Feed Rate (kg/hr) | 53 | 52 | 50 |
| Ethene Feed Rate (kg/h) | 29.9 | 29.2 | 28.6 |
| But-1-ene Feed Rate (kg/h) | 2.4 | 2.5 | 2.4 |
| Hydrogen Feed Rate (g/h) | 32 | 31 | 33 |
| Reactor Product | | | |
| Ethylene (mol %) | 7.2 | 7.0 | 7.2 |
| Hydrogen (mmol/mol total) | 10.3 | 10.2 | 10.6 |
| Solids (wt %) | 18.9 | 18.4 | 18.6 |
| $H_2/C_2H_4$ (mol/kmol) | 138 | 141 | 143 |
| $C_4H_8/C_2H_4$ (mol/kmol) | 325 | 327 | 309 |
| % $H_2$ Conversion | 16 | 16 | 21 |

As can be seen from Tables 1 and 2, the use of the η-liganded catalyst (as would take place in the early polymerization stage of the process of the invention) gives higher hydrogen conversion than can be done with the conventional Ziegler Natta catalysts.

What is claimed is:

1. A process for olefin polymerization comprising polymerising at least one α-olefin in a continuous reactor in the presence of hydrogen and an olefin polymerization catalyst, the catalyst system having catalysts with different active catalytic sites, the catalysts having different hydrogen consuming abilities whereby a rate of hydrogen consumption is controlled during the polymerization whereby to control the molecular weight of a polymer product, and wherein the hydrogen conversion is greater than 80%.

2. A process as claimed in claim 1 wherein the polymer product is an ethylene or propylene homo or copolymer.

3. A process as claimed in claim 2 wherein the polymer product is an ethylene copolymer.

4. A process as claimed in claim 1 wherein the olefin polymerisation catalyst comprises a metallocene catalyst.

5. A process as claimed in claim 4 wherein the olefin polymerisation catalyst comprises a metallocene catalyst and a chromium catalyst or a combination of two metallocene catalysts.

6. A process as claimed in claim 5 wherein the olefin polymerisation catalyst comprises a twin η-ligand metallocene or a single η-ligand metallocene.

7. A process as claimed in claim 1 wherein the catalyst is carried on a solid support.

8. A process as claimed in claim 7 wherein active catalytic sites are distributed evenly over the solid support.

9. A process as claimed in claim 1 wherein the process comprises at least two continuous polymerization stages, a relatively earlier of said stages comprising polymerizing at least one α-olefin in the presence of hydrogen and an olefin polymerization catalyst whereby to produce a first polymerization product, and a relatively later of said stages comprising polymerizing said at least one α-olefin in the presence of an olefin polymerization catalyst whereby to yield a polymerization product having a lower $MFR_2$ than said first polymerization product, wherein the hydrogen consumption rate is controlled in said relatively early stage whereby to control the molecular weight of said first product.

10. A process as claimed in claim 9 wherein the polymerisation takes place in mixed gas phase and slurry reactors.

11. A process as claimed in claim 10 wherein a first stage takes place in a slurry loop reactor and a second stage takes place in a gas phase fluidised reactor.

12. A process as claimed in claim 1 wherein hydrogen consumption rate is controlled by predictive computer control.

13. A process as claimed in claim 1 wherein hydrogen consumption rate is found by mass balance as the difference between the rate of molecular hydrogen going into the reactor system and the sum of the rates of molecular hydrogen leaving the reactor and accumulating in the reactor.

14. A process as claimed in claim 1 wherein the molecular weight of the product is controlled by controlling both the hydrogen consumption rate and the monomer consumption rate.

15. A process as claimed in claim 14 wherein the molecular weight of the product is controlled by analysis of the ratio between hydrogen consumption rate and monomer consumption raze.

16. A process for olefin polymerization comprising polymerising at least one α-olefin in a continuous reactor in the presence of hydrogen and an olefin polymerization catalyst a ratio of chemical consumption of hydrogen over a production rate in said reactor being controlled whereby to control the consistency of a polymer product made in said reactor or control consistency of a final polymer product.

17. A process as claimed in claim 16 wherein the hydrogen conversion is greater than 80%.

* * * * *